J. H. GRAY.
PROCESS OF SMELTING ORE.
APPLICATION FILED JULY 20, 1917.

1,283,500.

Patented Nov. 5, 1918.
3 SHEETS—SHEET 1.

INVENTOR
James H. Gray
BY
Anthony Ilma ATTORNEY

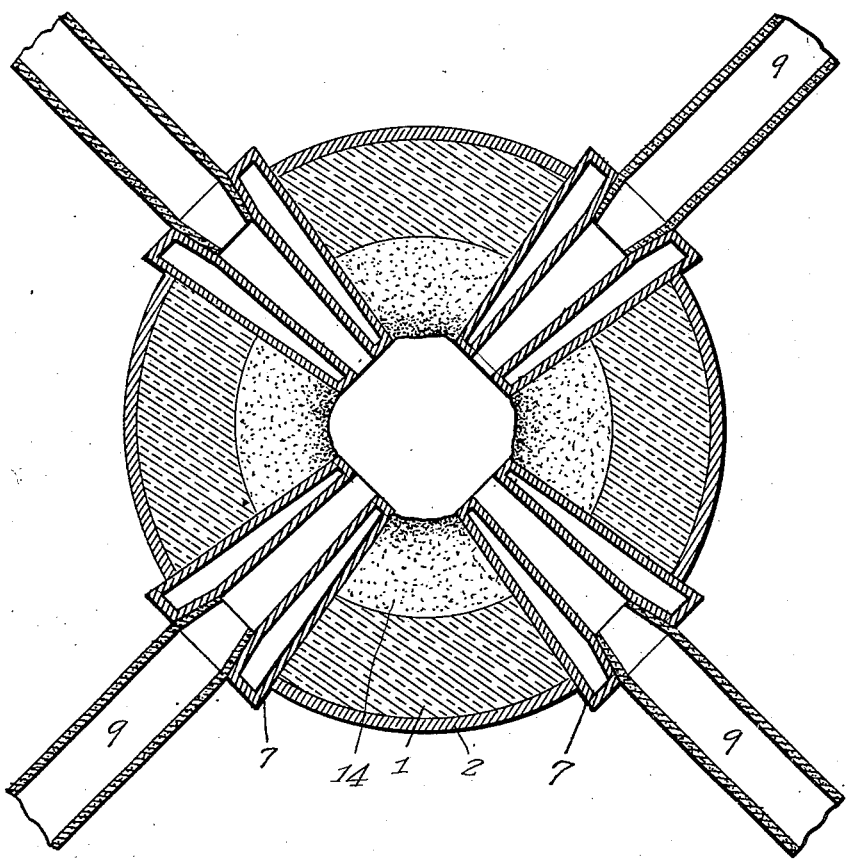

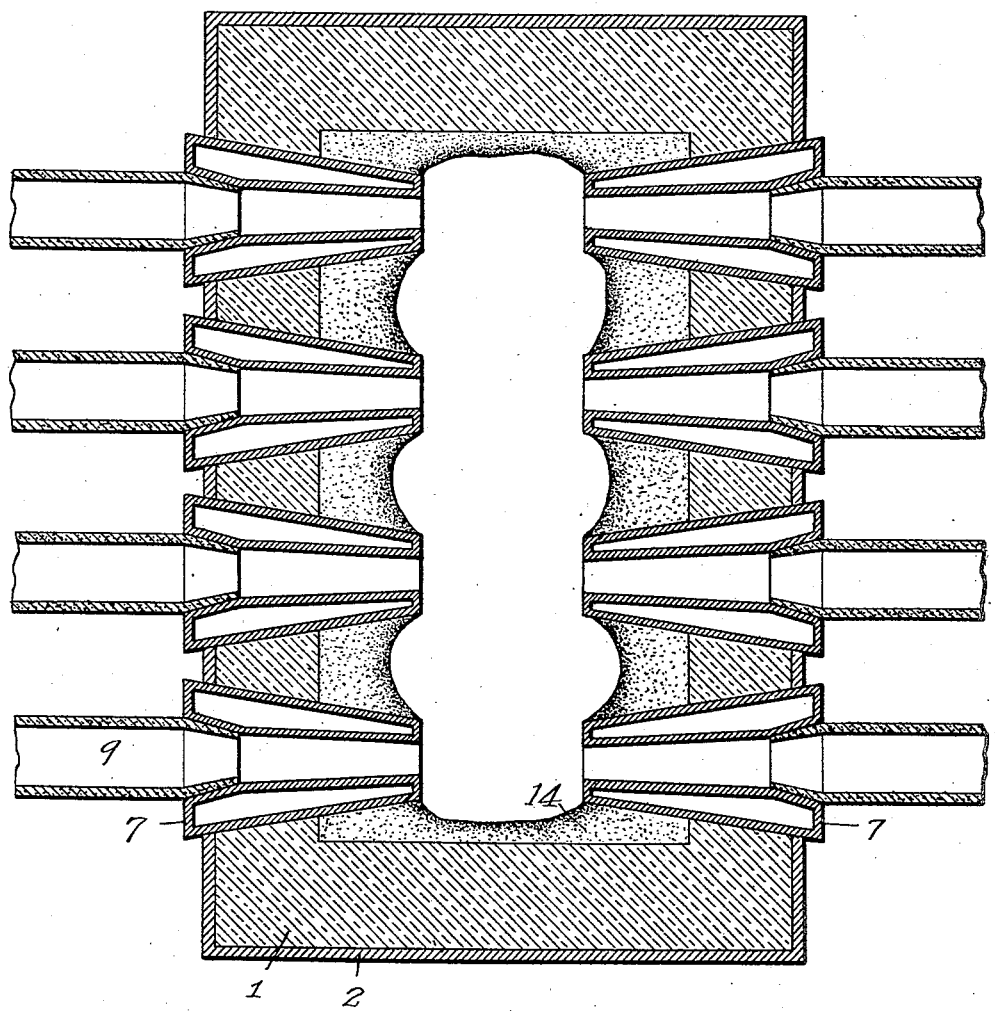

UNITED STATES PATENT OFFICE.

JAMES H. GRAY, OF NEW YORK, N. Y.

PROCESS OF SMELTING ORE.

1,283,500.  Specification of Letters Patent.  Patented Nov. 5, 1918.

Application filed July 20, 1917. Serial No. 181,757.

*To all whom it may concern:*

Be it known that I, JAMES H. GRAY, a citizen of the United States, residing in the city, county, and State of New York, have invented certain new and useful Improvements in Processes of Smelting Ore, of which the following is a specification.

My invention provides a process for the smelting of ores wherein the reducing agent is carbon and the source of heat is the combustion of carbon by pure oxygen. The usual method of smelting ores, such as the oxids of metals, for instance iron ore, is to use a furnace consisting of a hearth or crucible, over which is a shaft of considerable height. The total height of the furnace may be, for instance, one hundred feet. In such a furnace, the ore is mixed with coke and limestone in alternate layers. The limestone is used to form a fusible slag with such substances as silica, which are impurities in the ore. The coke serves the double purpose of producing heat in the hearth and performing a partial reduction of the ore by direct carbon reduction. The source of oxygen to burn the coke is atmospheric air blown into the furnace.

On account of the fact that the air contains 76% of nitrogen, which is an inert gas, the combustion of the coke is relatively slow. The portion of the coke not used in the lower part of the furnace for the direct reduction of ore is burned to carbon monoxid gas, which passes with the unburned nitrogen up through the shaft of the furnace.

The carbon monoxid gas is at the proper temperature to combine with the oxygen of the ore higher up in the furnace, and thus taking up an atom of oxygen, forms carbon dioxid. This reaction is called indirect reduction. The carbon dioxid continues up the shaft of the furnace and robs the coke of another atom of carbon, forming carbon monoxid, which passes out at the top of the furnace.

The previous tall furnace stack with its burden of materials is made necessary by the fact that the complete reduction cannot be accomplished in the hearth and indirect reduction must be resorted to, to utilize the gas given off. There is also a quantity of carbon monoxid coming from the furnace together with carbon dioxid and nitrogen, which form a gas of comparatively low thermal value, but which is burned outside the furnace for the purpose of heating the blast and for generating power.

By means of the furnace here described, the complete reduction of the ore is accomplished in the hearth of the furnace. By using pure or approximately pure oxygen, instead of air, to unite with the carbon of the charge, which may either be coke, bituminous coal, anthracite coal, charcoal, peat briquets or other carbonaceous matter, the combustion is very intense and rapid and a high temperature is produced locally.

As there is no shaft on the furnace and the fuel does not have to support a heavy burden of ore and limestone, a high grade metallurgical coke is not required; consequently, a cheaper fuel may be used than is customary in blast furnace practice.

Under such conditions it is possible to reduce ore so rapidly that additional charges of raw material may be introduced so fast that the entire process of reduction may be carried on within a small area without the conduction or radiation of heat to any appreciable distance from the source of heat. In this way it is possible to do away with the usual tall furnace stack, and also prevent loss of heat by radiation. With the use of pure oxygen it is not necessary to heat the blast of oxygen as is the case when using a blast of air.

As no tall stack, filled with material, is used, the pressure and velocity of the gases are small, consequently, there is a great saving in fine dust coming from the furnace, which is usually called flue-dust and which (with the old processes) may be as much as six to eight per cent. of the total charge of ore.

Instead of using limestone as a flux, it is preferable to use burnt lime. By the use of pure oxygen in this manner it is possible to save approximately one third of the amount of carbon usually used for smelting ores. Whereas in the usual furnace, in which air is used, a portion of the carbon generates heat and another portion is consumed by direct reduction, and a third portion by indirect reduction, this furnace, using pure oxygen, produces the heat and reduces the ore at practically the same time and place, and the saving in fuel is approximately one third. For instance, an ordinary blast furnace will consume about 1,800 pounds of coke per ton of pig iron produced. In my furnace, about 1,200 to 1,440 pounds of coke are required, approximately one-half of which is used in producing heat and the other half in reducing the ore. The quantity of coke required will vary according to several circumstances, such as the composition of the ore, the carbon content of the coke, the temperature of the offgoing gases and the composition of the pig iron as regards its content of such elements as silicon and manganese. By the concentration of heat in one place and the rapid replacement of reduced materials by successive additional charges, the refractory lining of the furnace is not attacked by heat. The oxygen is introduced through water-cooled twyers which project a considerable distance into the furnace. Unreduced ore, which is at first in a pasty condition, adheres to the sides of the furnace and about the water-cooled twyers, thus forming a secondary lining for the furnace. Such a furnace lining will last for years without replacement.

In recent years processes and machinery have been developed by which oxygen can be separated from the air at a very low cost. I use oxygen secured by any one of such processes to force into this metallurgical furnace.

The carbon monoxid gas which comes from the furnace is of high thermal value because it is not mixed with nitrogen. This gas may be taken from the furnace by means of suitable pipes, to be utilized elsewhere.

The accompanying drawings illustrate different styles of furnace for carrying out the process.

Fig. 2 is a horizontal section through the same.

Fig. 3 is an elevation of a rectangular furnace showing the twyers entering through both of the sides.

Figure 1:
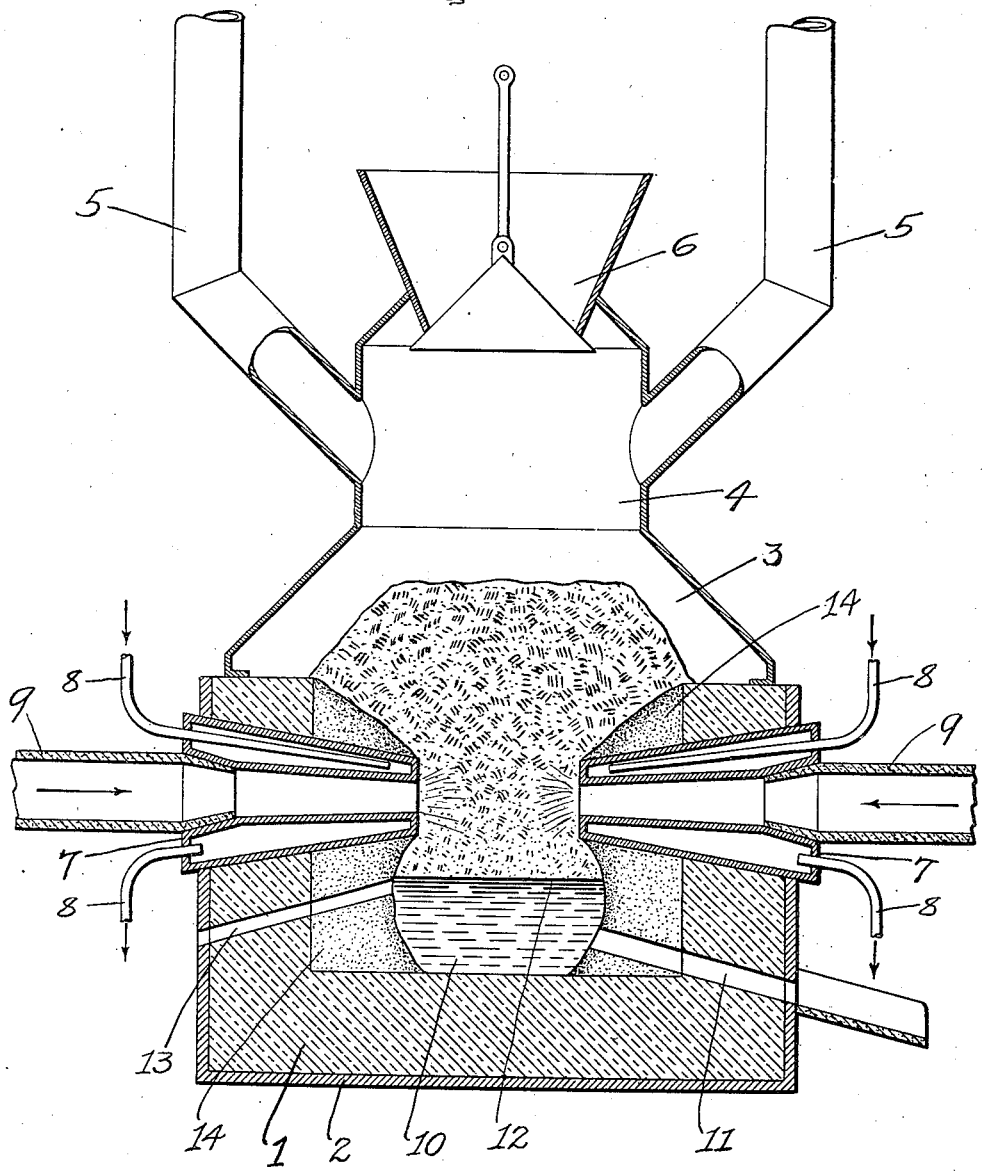
Figure 1 is a vertical section of smelting furnace.

Referring now to the furnaces illustrated, the furnace shown in Figs. 1 and 2 consists of a refractory body 1 which is surrounded by a metallic shell 2. A hood 3 is provided over the furnace for the purpose of collecting off-going gases from the furnace. A chamber 4 is provided over said hood through which the furnace is charged and through which off-going gases pass. The pipes 5, which extend outwardly and upwardly from the chamber 4, are for conveying away the furnace gases. A bell and hopper 6 are arranged above said chamber 4 for the purpose of charging the furnace and also for forming a seal when the furnace is closed. The horizontally arranged twyers 7 which extend through the sides of the furnace are provided with pipes 8 which admit water to the twyers (shown in the direction of the arrow) and discharge water from the twyers (shown in the direction of the arrow) and cool the same. The twyers project a considerable distance into the furnace and permit the introduction of pure oxygen thereinto. The pure oxygen is introduced first through blast pipes 9, which extend a short distance into the twyers, and then through the twyers into the furnace.

A small quantity of coke is placed in the hearth of the furnace. The coke is lighted and burns in the atmosphere of the furnace. When combustion is well under way, the various openings of the furnace are closed and at the same time a blast of pure oxygen is introduced through the twyers 7. An additional layer of coke, several inches in thickness, is dropped through the hopper 6 into the furnace. On to this bed of coke is dropped a mixture of ore, coke and burnt lime in the following proportions:

Ore _____ 72%
Lime _____ 8%
Coke _____ 20% which corresponds to a ratio between materials used and a ton of metal tapped as follows—

Metal _____ 2240 pounds
Ore _____ 4480 pounds
Lime _____ 500 pounds
Coke _____ 1200 pounds Successive charges of this mixture are added until the hearth of the furnace is filled. Smelting proceeds and the molten metal 10 collects in the bottom of the hearth of the furnace. Also a fused slag 12 gathers on the top of the pool of molten metal. When enough molten metal has accumulated in the hearth to bring the level of the slag 12 up to the slag tap hole 13, the slag 12 is drawn off through said tap hole 13. Then the tap hole 11 for withdrawing the molten metal 10 is opened and the metal withdrawn. This process is continued indefinitely, always keeping the level of the materials charged up to the top of the hearth. Unreduced materials soon accumulate on the side walls of the hearth and about the outer portions of the inner ends of the twyers thereby forming a secondary lining 14 for the furnace and thus protecting it from the intense heat of combustion at the inner ends of the twyers. This process may be continued for years without shutting down the furnace or repairing the lining. It is, however, an easy matter to discontinue the operation of the furnace on account of the absence of any large mass of stock contained in the superimposed shaft.

The process involves a departure, not merely in degree, but in principle from the ordinary blast furnace operations which maintain a high shaft full of stock and which commence the combustion and reduction at the bottom of the furnace and continue these to a diminishing extent throughout all or the greater part of the height of the stack. It has been proposed to operate such ordinary blast furnaces with air enriched to a large extent with oxygen so as to secure a higher temperature and to reduce a greater quantity of ore. But my process is distinguished from this in that the prime purpose is to reduce the consumption of coke, and to effect this by the use of oxygen so pure that the combustion of carbon by the blast is practically completed in the immediate neighborhood of the points where the oxygen is admitted, an intense heat is generated in this comparatively small space and the complete reduction of ore, at least to the extent desired, is accomplished in practically the same space. This avoids the necessity of a high shaft and a high column of the charge, with a quantity of coke which is largely wasted as far as the actual smelting operations are concerned. And while my process may be carried out in such furnaces and with such a high column of stock above the zone of combustion and reduction, yet I prefer the arrangement illustrated in which there is maintained above the combustion space referred to only a sufficient quantity of the charge to keep such space filled. The operation thus approximates that in the electric arc furnace of an extremely high temperature very closely localized and producing the desired reactions with the greatest economy of carbon and resembles the ordinary blast furnace only in the use of a blast of oxidizing gas.

Several modifications in the arrangement of the furnace may be made from the one above described. For instance, the furnace may be long and rectangular in horizontal section having a number of twyers 7 (Fig. 3) entering through both of the long sides.

Though I have described with great particularity certain processes embodying my invention, yet it is not to be understood therefrom that the invention is restricted to the embodiments disclosed. Various modifications may be made by those skilled in the art without departure from the invention, as defined in the appended claims.

What I claim is—

1. The process of smelting ore by carbon reduction in which the necessary heat is furnished by introducing pure oxygen at points beyond the inner face of the furnace wall so that the combustion takes place within the area limited by the points of introduction of the oxygen and the unreduced materials which accumulate around such area.

2. The process of smelting ores by carbon reduction which consists in introducing a blast of pure oxygen into a charge of ore and carbon so that the combustion of carbon by the blast is practically completed in the immediate neighborhood of the points of admission of the oxygen and an intense heat is thus generated in a comparatively small space (as distinguished from the high shaft of the ordinary blast furnace) and the complete reduction of ore is accomplished in substantially the same space.

3. The process of smelting ores by carbon reduction which consists in introducing a blast of pure oxygen into a charge of ore and carbon so that the combustion of carbon by the blast is practically completed in the immediate neighborhood of the points of admission of the oxygen and an intense heat is thus generated in a comparatively small space (as distinguished from the high shaft of the ordinary blast furnace) and the complete reduction of ore is accomplished in substantially the same space, and maintaining above such space only a sufficient quantity of the charge to keep such space filled.

In witness whereof, I have hereunto signed my name.

JAMES H. GRAY.